(12) United States Patent
Bhavsar

(10) Patent No.: US 8,374,913 B2
(45) Date of Patent: Feb. 12, 2013

(54) METHOD AND SYSTEM FOR COMPARING EFFECTS OF AUDIO-VISUAL ADS ON INTERNET SEARCHES

(75) Inventor: Nirav Bhavsar, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1304 days.

(21) Appl. No.: 12/099,042

(22) Filed: Apr. 7, 2008

(65) Prior Publication Data

US 2009/0254415 A1    Oct. 8, 2009

(51) Int. Cl.
*G06Q 30/00* (2012.01)

(52) U.S. Cl. .................. 705/14.4; 705/14.41; 705/14.43

(58) Field of Classification Search ................. 705/14.4, 705/14.41, 114.43
See application file for complete search history.

(56) References Cited

U.S. PATENT DOCUMENTS

| | | | | |
|---|---|---|---|---|
| 6,829,780 | B2* | 12/2004 | Kraft et al. | 725/42 |
| 7,181,438 | B1* | 2/2007 | Szabo | 1/1 |
| 7,805,740 | B2* | 9/2010 | Gilboa et al. | 725/18 |
| 7,970,608 | B2* | 6/2011 | Madhavapeddi et al. | 704/235 |
| 2006/0149624 | A1* | 7/2006 | Baluja et al. | 705/14 |
| 2006/0229930 | A9* | 10/2006 | Gottfurcht | 705/10 |
| 2006/0287919 | A1* | 12/2006 | Rubens et al. | 705/14 |
| 2007/0078708 | A1* | 4/2007 | Yu et al. | 705/14 |
| 2007/0078709 | A1* | 4/2007 | Rajaram | 705/14 |
| 2007/0130009 | A1* | 6/2007 | Steelberg et al. | 705/14 |
| 2007/0130014 | A1* | 6/2007 | Altberg et al. | 705/14 |
| 2008/0154678 | A1* | 6/2008 | Botelho | 705/7 |
| 2008/0235089 | A1* | 9/2008 | Weyer et al. | 705/14 |
| 2008/0255937 | A1* | 10/2008 | Chang et al. | 705/14 |
| 2009/0030775 | A1* | 1/2009 | Vieri | 705/10 |
| 2009/0076886 | A1* | 3/2009 | Dulitz et al. | 705/10 |
| 2009/0076887 | A1* | 3/2009 | Spivack et al. | 705/10 |
| 2009/0106099 | A1* | 4/2009 | Chow et al. | 705/14 |
| 2009/0119166 | A1* | 5/2009 | Taylor et al. | 705/14 |
| 2009/0187459 | A1* | 7/2009 | Hayes et al. | 705/10 |
| 2009/0210301 | A1* | 8/2009 | Porter et al. | 705/14 |
| 2009/0234734 | A1* | 9/2009 | Gollapudi et al. | 705/14 |
| 2009/0235312 | A1* | 9/2009 | Morad et al. | 725/44 |
| 2010/0262486 | A1* | 10/2010 | Matsunaga et al. | 705/14.43 |
| 2011/0035270 | A1* | 2/2011 | Matsunaga et al. | 705/14.41 |

\* cited by examiner

*Primary Examiner* — Jagdish Patel
*Assistant Examiner* — Sara C Hamilton
(74) *Attorney, Agent, or Firm* — Stattler-Suh PC

(57) ABSTRACT

A method and system are provided for comparing an effect of an audio-visual ad on Internet searches. In one example, the method includes receiving a keyword search related to the audio-visual ad and storing the keyword search in a keyword search database, extracting ad related keywords from digitized text of the audio-visual ad and storing the ad related keywords in an ad keyword database, comparing the ad keyword database to the keyword search database, wherein the comparing includes determining an ad effectiveness rank of the audio-visual ad, and storing the ad effectiveness rank of the audio-visual ad in an ad effectiveness database.

21 Claims, 3 Drawing Sheets

METHOD AND SYSTEM FOR COMPARING EFFECTS OF AUDIO-VISUAL ADS ON INTERNET SEARCHES

FIELD OF THE INVENTION

The present invention relates to audio-visual advertising. More particularly, the present invention relates to audio-visual advertising and its effect on consumers doing Internet searching.

BACKGROUND OF THE INVENTION

An advertiser, such as Ford® or McDonald's®, generally contracts a creative agency for ads to be placed in various media for the advertiser's products. Such media may include TV, radio, Internet ads (e.g., banner display ads, textual ads, streaming ads, mobile phone ads), print media ads (e.g., ads in newspapers, magazines and posters). It is quite possible that the advertiser may engage one or more creative agencies that specialize in creating ads for one or more of the above media.

The search advertising marketplace generates billions of dollars in revenue each year for a search engine, for example, Yahoo!®. The search marketing marketplace works on a cost-per-click (CPC) model. When a consumer performs a search query online and clicks on a sponsored search text ad, a company like Yahoo!® is paid by the respective advertiser. Consumers tend to click on more relevant ads. It is the company's best interest to show the most relevant ads to consumers, in order to get more clicks on these ads. In order to do this, the company needs to gather information about consumers' search behavior and click behavior. Search behavior is what the consumer searches. Primary evidence for search behavior is the key words used in the consumer search. Click behavior is what the consumer clicks on the search page after a search. The clicks may include clicking to select an ad, clicking to close an ad, etc. The company can then use this information to target relevant ads to different consumers.

In the CPC model, there are two important events—search events and click events. Search events occur when a consumer performs a search query. Click events occur when a consumer clicks on a sponsored text ad. Web servers of a company like Yahoo!® collect search events when a consumer performs a query on the company's search page. URLs of the ads on the search result webpage may contain the click event information. The company wants to collect and analyze the search and click events in order to build a model for query-to-text ad relevance. If the company can learn which ads are more relevant, then the company can target these ads to consumers and get a higher click-through rate (CTR).

Perhaps what is more difficult is that there is currently no way for a company like Yahoo!® to tell non-search advertisers whether or not a particular Internet search was related to a particular non-search ad. Non-search advertisers include advertisers who place TV ads, radio ads or Internet-based visual ads (e.g., display ads, video ads, etc.). For example, a consumer may see a JCPenney® TV commercial related to diamond jewelry. That consumer may subsequently perform an Internet search based on the JCPenney® ad, which may have sparked the consumer's interest in getting an engagement ring for his fiance. It is difficult for advertisers like JCPenney® to understand effects that their audio-visual ad campaigns have on consumers who see an offline ad and later do Internet searches.

SUMMARY OF THE INVENTION

What is needed is an improved method having features for addressing the problems mentioned above and new features not yet discussed. Broadly speaking, the present invention fills these needs by providing a method and system of comparing effects of audio-visual ads on Internet searches. It should be appreciated that the present invention can be implemented in numerous ways, including as a method, a process, an apparatus, a system or a device. Inventive embodiments of the present invention are summarized below.

In one embodiment, a method is provided for comparing an effect of an audio-visual ad on Internet searches. The method comprises receiving a keyword search related to the audio-visual ad and storing the keyword search in a keyword search database, extracting ad related keywords from digitized text of the audio-visual ad and storing the ad related keywords in an ad keyword database, comparing the ad keyword database to the keyword search database, wherein the comparing includes determining an ad effectiveness rank of the audio-visual ad, and storing the ad effectiveness rank of the audio-visual ad in an ad effectiveness database.

In another embodiment, a system is provided for comparing an effect of an audio-visual ad on Internet searches. The system comprises a search engine device configured to receive a keyword search related to the audio-visual ad; a keyword database configured to store the keyword search; a digitizer device configured to extract ad related keywords from digitized text of the audio-visual ad; an ad keyword database configured to store the ad related keywords; a comparator device configured to compare the ad keyword database to the keyword search database and further configured to determine an ad effectiveness rank of the audio-visual ad; and an ad effectiveness database configured to store the ad effectiveness rank of the audio-visual ad.

In still another embodiment, an apparatus is provided for comparing an effect of an audio-visual ad on Internet searches. The apparatus comprises a search engine device configured to receive a keyword search related to the audio-visual ad, and further configured to store the keyword search in a keyword database; a digitizer device configured to extract ad related keywords from digitized text of the audio-visual ad, and further configured to store the ad related keywords in an ad keyword database; and a comparator device configured to compare the ad keyword database to the keyword search database, and further configured to determine an ad effectiveness rank of the audio-visual ad, and further configured to store the ad effectiveness rank in an ad effectiveness database.

In yet another embodiment, a computer readable medium is provided for carrying one or more instructions for comparing an effect of an audio-visual ad on Internet searches. The one or more instructions, when executed by one or more processors, cause the one or more processors to perform the steps of receiving a keyword search related to the audio-visual ad and storing the keyword search in a keyword search database, extracting ad related keywords from digitized text of the audio-visual ad and storing the ad related keywords in an ad keyword database, comparing the ad keyword database to the keyword search database, wherein the comparing includes determining an ad effectiveness rank of the audio-visual ad, and storing the ad effectiveness rank of the audio-visual ad in an ad effectiveness database.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE INVENTION

An invention for a method and system for comparing effects of audio-visual ads on Internet searches is disclosed. Numerous specific details are set forth in order to provide a thorough understanding of the present invention. It will be understood, however, to one skilled in the art, that the present invention may be practiced with other specific details.

General Overview

The system of the present invention provides a way to measure effects of audio-visual ads on internet searches in real time. Commercials are provided. The system receives search from consumers performing search queries. The system records audio data from audio-visual commercials. The system extracts ad related keywords and stores the ad related keywords into a database. The system then compares the ad related keywords to the search data in order to identify triggers in the audio-visual commercials that affect search queries. Once the affects are known, a creative agency can ultimately provide better ads.

This solution will help advertisers efficiently create ad campaigns that motivate people to go to a search engine and research in more detail about a particular product. From a search engine point of view, this would allow a company like Yahoo!® to charge a premium for certain keywords that share common ground with the commercial and the consumer search.

Figure 1:
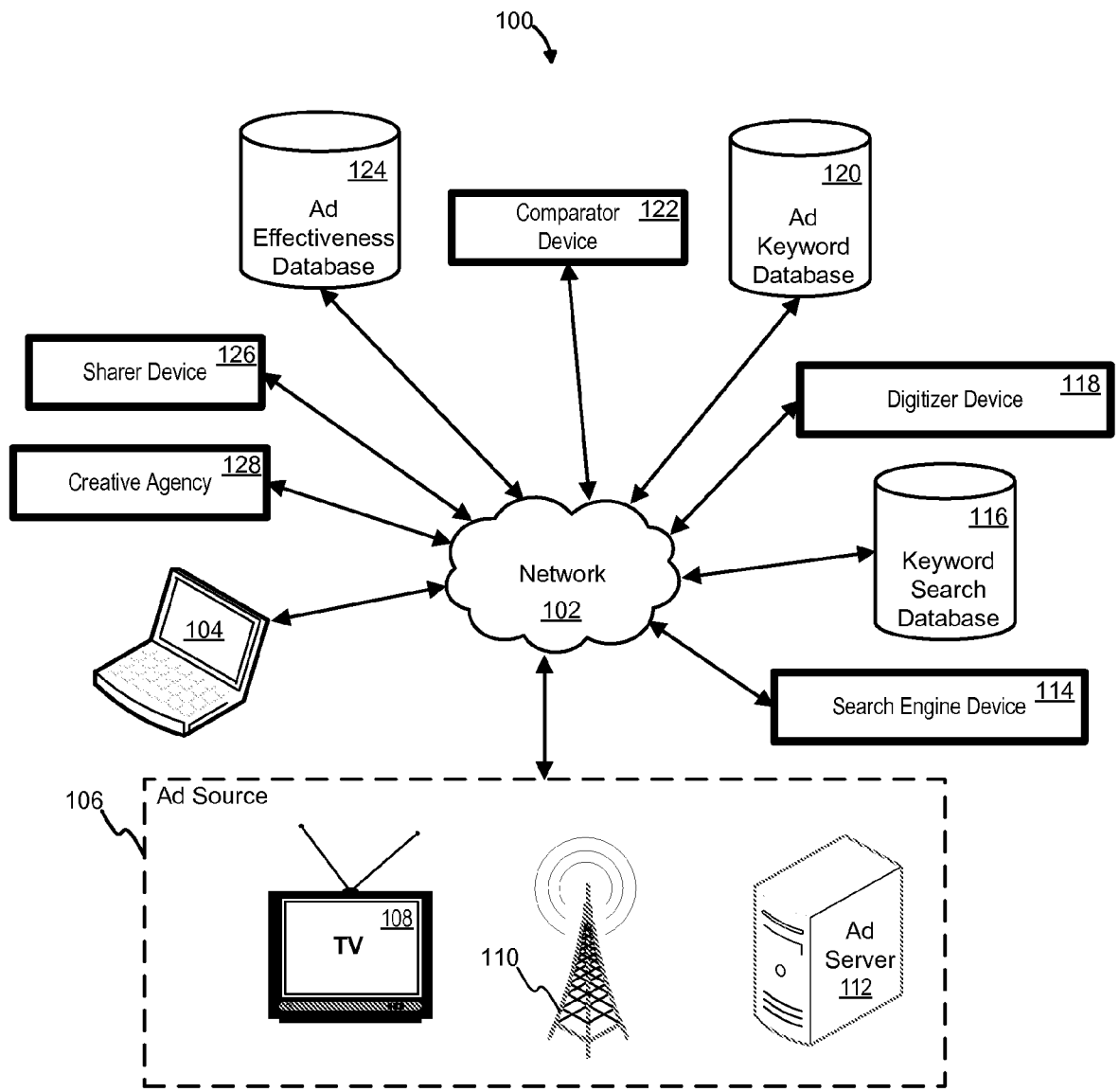
FIG. 1 is a block diagram of a system for comparing effects of audio-visual ads on Internet searches, in accordance with an embodiment of the present invention.

FIG. 1 is a block diagram of a system 100 for comparing effects of audio-visual ads on Internet searches, in accordance with an embodiment of the present invention. Audio-visual ads (or commercials) include without limitation TV ads, radio ads and Internet-based visual ads. Examples of Internet-based visual ads include without limitation display ads and video ads.

A device of the present invention is hardware, software or a combination thereof. A device may sometimes be referred to as an apparatus. Each device is configured to carry out one or more steps of the method of comparing effects of audio-visual ads on Internet searches.

The network 102 couples together a consumer computer 104, an ad source 106, a search engine device 114, a keyword search database 116, a digitizer device 118, an ad keyword database 120, a comparator device 122, an ad effectiveness database 124, a sharer device 126 and a creative agency 128. The network 102 may be any combination of networks, including without limitation the Internet, a local area network, a wide area network, a wireless network and a cellular network. The ad source 106 includes without limitation a TV station 108, a radio station 110 and an ad server 112. The digitizer device 118 is configured to perform speech recognition and/or optical character recognition (OCR).

Alternatively, one apparatus may contain two or more devices of the system 100. For example, one apparatus may contain two or more of the devices that include the search engine device 114, the keyword search database 116, the digitizer device 118, the ad keyword database 120, the comparator device 122, the ad effectiveness database 124 and the sharer device 126.

ILLUSTRATIVE EXAMPLES

Figure 2:
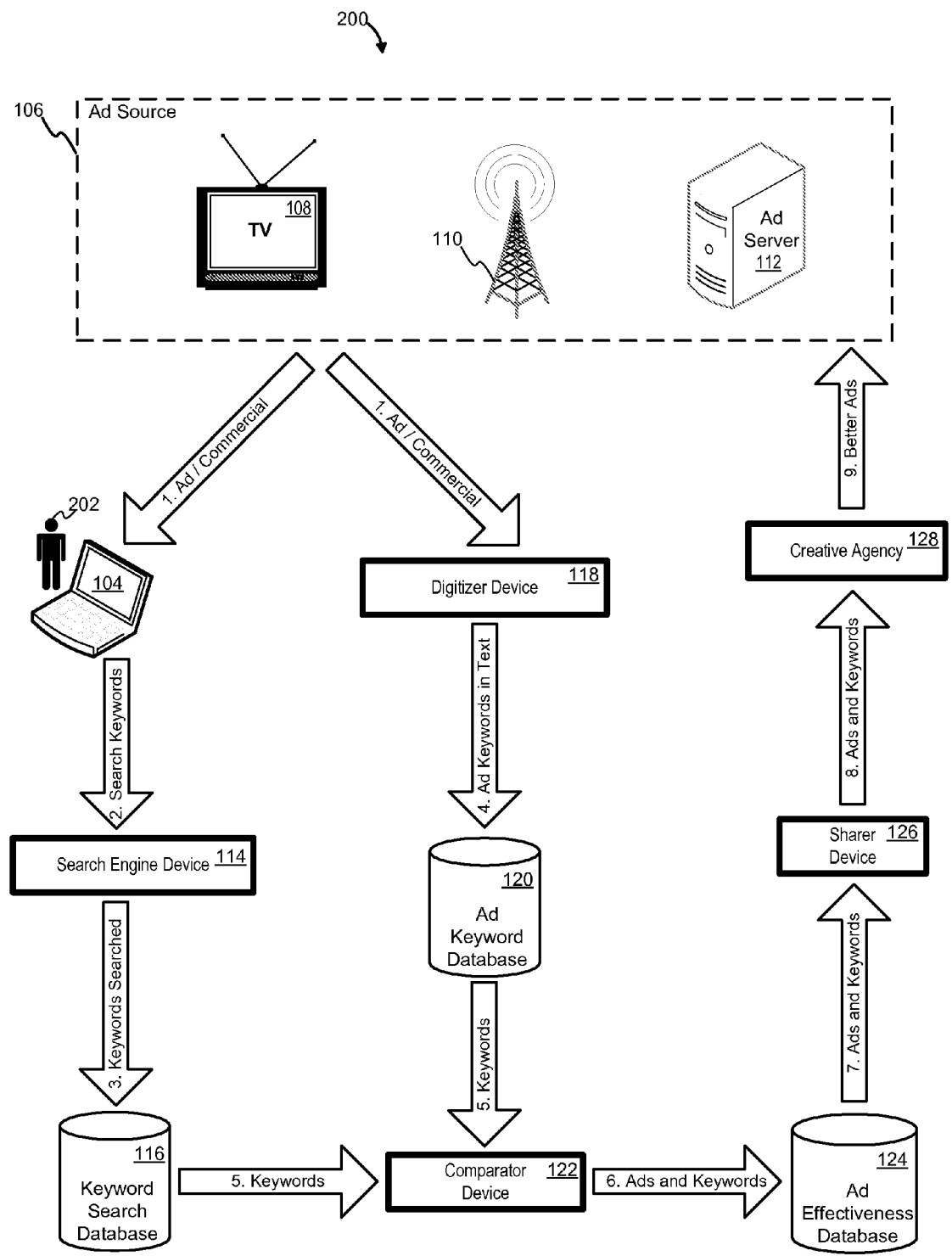
FIG. 2 is a schematic diagram of a system for comparing effects of audio-visual ads on Internet searches, in accordance with an embodiment of the present invention.

FIG. 2 is a schematic diagram of a system 200 for comparing effects of audio-visual ads on Internet searches, in accordance with an embodiment of the present invention. The system 200 provides a way to measure effectiveness of audio-visual ads (or commercials) on internet searches.

The ad source 106 provides an ad (or commercial) to a consumer 202. Such an ad may be received, for example, from a TV station 108, a radio station 110 or an ad server 112, among other ad sources. The digitizer device 118 also receives the ad via some sort of network connection that provides the ad in a digital format.

The consumer 202 then performs an Internet search via the consumer computer 104. The Internet search may be related to the consumer's experience with the ad. The search engine device 114 receives this keyword search from the consumer computer 104. Examples of a search engine device 114 include Yahoo!®, Google® and Live.com. The search engine 114 records all keyword searches, each keyword search having a time stamp, a location and other associated information. The search engine 114 may derive the location of a particular search from the IP (Internet Protocol) address of the consumer computer 104. The search engine 114 stores the keywords from the searches in a keyword search database 116. The search engine 114 stores each keyword search with an associated timestamp indicating when the search engine device 114 received the keyword search from the consumer computer 104.

For explanatory purposes, the consumer 202 and the devices of the system 200 may be referred to as being singular. However, the embodiment is not so limited. For example, the system 200 is configured to receive many searches from many different consumers. If many different users respond to the ad by performing an Internet Search, there will be a spike in Internet searches using particular keywords in a particular location (based on IP addresses) during a particular time period after the ad source 106 provided the ad. The comparator device determines search spikes by comparing regular activity of the search engine 114 in a particular location and time when the ad is not shown.

The digitizer device 118 records audio and images from audio-visual commercials. Regarding the images, the digitizer device 118 may take screen shots of key portions of the TV commercial or Internet display ad in order to obtain the images. In fact, a TV commercial or Internet display ad sometimes uses no audio at all; in such a case, the captured screen shots are vital. The digitizer device 118 then converts the audio and images into digital text and extracts ad related keywords from the digital text. The digitizer device 118 then stores the ad related keywords into the ad keyword database 120. The digitizer device 118 stores each ad related keyword with an associated ad, which includes a timestamp, location of ad, and other ad information.

The comparator device 122 receives the ad related keywords from the ad keyword database 120 and receives the keyword searches from the keyword search database 116. The files in the ad keyword database 120 and in the keyword search database 116 include keywords, timestamps and source information. The comparator device 122 uses an algorithm to compare the files in the ad keyword database 120 to the files in the keyword search database 116 in order to find common keywords based on their source and timestamp. The comparator device 122 determines the ad effectiveness rank of each ad based on an algorithm.

Timestamps, locations and other information are important for determining the ad effectiveness ranking. Note that all the keyword searches and all the ads have associated time stamps and associated locations. The comparator device 122 performs a statistical analysis based on locations, timestamps, or click-throughs to search result, among other things. A click-through is where a consumer clicks on a ad-related link in a search result page. The statistical analysis involves analyzing the locations, timestamps or click-throughs to determine if there is a search spike. For example, in determining ad effectiveness, an Internet search performed within a particular time period (e.g., 10 minutes) after ad is shown may cause the ad to receive a higher effectiveness ranking. An Internet search performed after the particular time period may have a lesser effect on the ad effectiveness rank. Accordingly, there is a particular period (e.g., one hour) after which the comparator device 122 will show a decreasing association between a keyword search and a particular ad. Likewise, Internet searches performed in the same location that an ad is shown will be more relevant to determining the ad effectiveness rank. The comparator device 122 may also enhance the ad effectiveness rank if the consumer not only performs a keyword search but also clicks-through to a search result link—the more relevant the search result link to the ad, the higher the ad effectiveness rank. Thus, the algorithm for determining the ad effectiveness rank is calibrated based on timestamps, locations, keywords, click-throughs, search spikes and other information.

The comparator device 122 then stores trigger keywords that may have sparked a consumer to do an Internet search, sources, timestamps, ad effectiveness ranks and related data in the ad effectiveness database 124.

The sharer device 126 receives the effective ads and the ad trigger keywords from the ad effectiveness database 124. The sharer device 126 shares the effective ads and the ad enhancer keywords with a creative agency 128. The creative agency 128 may then provide better ads to its clients who seek to advertise via a TV station 108, a radio station 110 or an ad server 112, among other things.

The following is an example of how the system 200 may handle a particular TV commercial. Here are the particulars of the commercial. The source of the commercial is Channel 2 KTVU. The date of the commercial is Sunday, Dec. 2, 2007. The time of the commercial is 4:15 pm Pacific Time. A brief synopsis of the commercial is "J.C. Penny 3 day sale on diamond jewelry." The place that the commercial is shown is the San Francisco Bay Area.

The ad source 106 shows the TV commercial to a consumer 202. The digitizer device 118 also receives the ad.

The consumer 202 performs an Internet search via the consumer computer. For example, at 5:00 pm, the consumer 202 goes online and searches for diamond jewelry via Yahoo!®, which is operating as a search engine device 114. The Yahoo!® search engine records the consumer search and returns results to the consumer computer 104 that match the consumer's query, which may be "diamond jewelry" for example. The Yahoo!® search engine records the query's time, keywords and location, among other information. Yahoo!® may record an unusually high number of searches during a particular time period after the TV commercial. The Yahoo!® search engine stores all of this information from many consumers into the keyword search database 116.

The digitizer device 118 records audio and images from audio-visual commercials. The digitizer device 118 then converts the audio and images into digital text, scans the digital text, and extracts ad related keywords from the digital text. For example, the digitizer device 118 may pick out "journey diamond pendant, "diamond", "holiday sale", "diamond pendant", "diamond jewelry", etc. The digitizer device 118 then stores the ad related keywords into the ad keyword database 120.

The comparator device 122 uses an algorithm to compare the ad keyword database 120 to the keyword search database 116. The comparator device 122 determines the ad-effectiveness ranking of keywords that prompted searches related to ads. Each ad is identified based on its recorded data. For example, the comparator device 122 may be able to identify a spike for keyword searches within one hour that the ad source 106 provided the TV commercial.

The comparator device 122 then stores trigger keywords that may have sparked a consumer to do an Internet search, sources, timestamps, ad effectiveness ranks and related data in the ad effectiveness database 124.

The sharer device 126 then, for example, shares the information in the ad effectiveness database 124 with Yahoo!® creative department or a creative agency. The creative department is then better equipped to create display ads that can result in more searches. The creative agency is also better equipped to create TV and radio commercials that are more effective for their client. Using this system, advertisers can now quantify the effect that their audio-visual ad campaign has on consumer search behavior.

Figure 3:
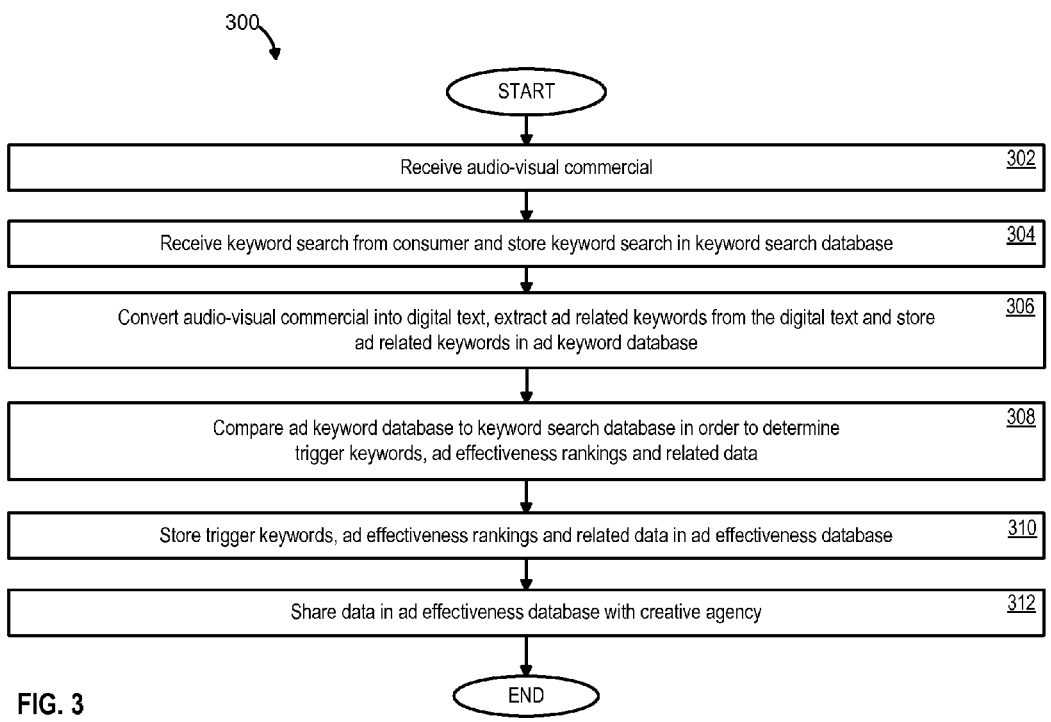
FIG. 3 is a flowchart of a method for comparing effects of audio-visual ads on Internet searches, in accordance with an embodiment of the present invention.

FIG. 3 is a flowchart of a method 300 for comparing effects of audio-visual ads on Internet searches, in accordance with an embodiment of the present invention. The method 300 starts in step 302 where the system receives an audio-visual commercial. The digitizer device 118 of FIG. 2 may be configured to carry out step 302. Meanwhile, a consumer somewhere is also viewing the audio-visual commercial. Next, in step 304, the system receives a keyword search from the consumer and stores the keyword search in a keyword search database. The search engine device 114 of FIG. 2 may be configured to carry out step 304. In step 306, the system converts the audio-visual commercial into digital text, extracts ad related keywords from the digital text and stores ad related keywords in an ad keyword database. This step 306 may occur at substantially the same time as step 304. The digitizer device 118 of FIG. 2 may be configured to carry out step 306.

The method 300 then moves to step 308 where the system compares the ad keyword database to the keyword search database. The system uses an algorithm to make the comparison in order to determine trigger keywords, ad effectiveness rankings and related data. The comparator device 122 of FIG. 2 may be configured to carry out step 308. Proceeding to step 310, the system stores the trigger keywords that may have sparked a consumer to do an Internet search, sources, timestamps, ad effectiveness ranks and related data in an ad effectiveness database. The comparator device 122 of FIG. 2 may be configured to carry out step 310. The method 300 then moves to step 312 where the system shares data in the ad effectiveness dataset with a creative agency. The sharer device 126 of FIG. 2 may be configured to carry out step 312. The method 300 is then at an end.

Computer Readable Medium Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application-specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including without limitation receiving a keyword search related to the audio-visual ad and storing the keyword search in a keyword search database, extracting ad related keywords from digitized text of the audio-visual ad and storing the ad related keywords in an ad keyword database, comparing the ad keyword database to the keyword search database, wherein the comparing includes determining an ad effectiveness rank of the audio-visual ad, and storing the ad effectiveness rank of the audio-visual ad in an ad effectiveness database, according to processes of the present invention.

Advantages

The system of the present invention helps to improve the quality of offline ads and Internet display ads for online sellers. The system helps the sellers determine keyword triggers that motivate buyers to come online and research more. The system also motivates sellers (advertisers) to bid more aggressively for trigger keywords in sponsored searches carried out by search engines.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of determining an effect of an audio-visual advertisement, the method comprising:
    delivering, over a network, the audio-visual advertisement to a user computer;
    receiving a search query comprising one or more keywords submitted over the network by the user;
    extracting advertisement keywords from digitized text corresponding to audio and video from the audio-visual advertisement; and
    comparing, by a computer, the advertisement keywords to the one or more keywords from the search query by determining an advertisement effectiveness rank of the audio-visual advertisement, the advertisement effectiveness rank is based on common keywords between the advertisement keywords and the one or more keywords of the search query and a time difference between the delivering of the audio-visual advertisement to the user and the receiving of the search query from the user.

2. The method of claim 1, further comprising sharing the advertisement effectiveness rank with a creative agency.

3. The method of claim 1, wherein the audio-visual advertisement is one of:
    a TV commercial;
    a radio commercial; or
    an Internet visual advertisement.

4. The method of claim 1, wherein extracting the advertisement keywords from the digitized text is preceded by converting the audio-visual advertisement into digital text.

5. The method of claim 4, wherein converting the audio-visual advertisement comprises taking screen shots of key portions of the audio-visual advertisement.

6. The method of claim 4, wherein converting the audio-visual ad comprises performing speech recognition on an audio recording of the audio-visual ad.

7. The method of claim 4, wherein converting the audio-visual ad comprises performing optical character recognition on an image captured from the audio-visual ad.

8. The method of claim 1, wherein the comparing further includes determining trigger keywords.

9. The method of claim 1, wherein the search query is stored with at least one of a search timestamp, a search location and a click-through, wherein each advertisement keyword is stored with at least one of an advertisement timestamp and an advertisement location, and wherein the comparing further includes performing a statistical analysis based on at least one of locations, timestamps, and click-throughs.

10. The method of claim 9, wherein the statistical analysis further includes analyzing at least one of locations, timestamps and click-throughs to determine if there is a search spike associated with the audio-visual advertisement.

11. A system, comprising at least one processor and memory, for determining an effect of an audio-visual advertisement, the system comprising:
    a module to deliver, over a network, the audio-visual advertisement to a user computer;
    a module to receive a search query comprising one or more keywords submitted over the network by the user;
    a module to extract advertisement keywords from digitized text corresponding to audio and video from the audio-visual advertisement; and
    a module to compare, by the processor, the advertisement keywords to the one or more keywords from the search query by determining an advertisement effectiveness rank of the audio-visual advertisement, the advertisement effectiveness rank is based on common keywords between the advertisement keywords and the one or more keywords of the search query and a time difference between the delivering of the audio-visual advertisement to the user and the receiving of the search query from the user.

12. The system of claim 11, further comprising a module to share the advertisement effectiveness rank with a creative agency.

13. The system of claim 11, wherein the audio-visual advertisement is one of:
    a TV commercial;

a radio commercial; or an Internet visual advertisement.

14. The system of claim 11, wherein the digitized text is created by converting the audio-visual advertisement into digital text by taking screen shots of key portions of the audio-visual advertisement.

15. The system of claim 14, wherein the digital text represents portions of the audio-visual advertisement.

16. The system of claim 14, wherein the digitizer is further configured to perform speech recognition on an audio recording of the audio-visual ad.

17. The system of claim 14, wherein the digitizer is further configured to perform optical character recognition on an image captured from the audio-visual ad.

18. The system of claim 11, wherein the comparing is further to determine trigger keywords.

19. The system of claim 11, further comprising:

an advertisement keyword database configured to store each search keyword with at least one of a search timestamp, a search location and a click-through, and further configured to store each advertisement keyword with at least one of an advertisement timestamp and an advertisement location, and wherein the comparing is further to perform a statistical analysis based on at least one of the search locations, the timestamps and the click-throughs.

20. The system of claim 19, wherein the comparing is further to analyze at least one of the search locations, the timestamps and the click-throughs to determine if there is a search spike.

21. A non-transitory computer readable medium carrying one or more instructions for determining an effect of an audio-visual advertisement, wherein the one or more instructions, when executed by one or more processors, causes the one or more processors to perform the steps of:

delivering, over a network, the audio-visual advertisement to a user computer;

receiving a search query comprising one or more keywords submitted over the network by the user;

extracting advertisement keywords from digitized text corresponding to audio and video from the audio-visual advertisement; and comparing the advertisement keywords to the one or more keywords from the search query by determining an advertisement effectiveness rank of the audio-visual advertisement, the advertisement effectiveness rank is based on common keywords between the advertisement keywords and the one or more keywords of the search query and a time difference between the delivering of the audio-visual advertisement to the user and the receiving of the search query from the user.

* * * * *